United States Patent [19]

Eckardt et al.

[11] 4,391,644

[45] Jul. 5, 1983

[54] SHAPED ARTICLES MADE FROM EXPANDED MINERALS

[75] Inventors: Peter Eckardt, Hofheim am Taunus; Franz J. Voetz, Camberg, both of Fed. Rep. of Germany

[73] Assignee: Hoechst Aktiengesellschaft, Fed. Rep. of Germany

[21] Appl. No.: 341,233

[22] Filed: Jan. 21, 1982

[30] Foreign Application Priority Data

Jan. 27, 1981 [DE] Fed. Rep. of Germany ....... 3102542

[51] Int. Cl.³ .............................................. C04B 31/44
[52] U.S. Cl. ..................... 106/85; 106/104; 106/308 N
[58] Field of Search ..................... 106/85, 104, 308 F, 106/DIG. 2, 308 N, 288 B, 308 Q

[56] References Cited

U.S. PATENT DOCUMENTS 3,966,482   6/1976   Cassidy et al. .......... 106/85

FOREIGN PATENT DOCUMENTS 592793   2/1978   U.S.S.R. ........... 106/DIG. 2

Primary Examiner—James Poer
Attorney, Agent, or Firm—Connolly and Hutz

[57] ABSTRACT

Shaped articles made from expanded minerals obtained by treating a mixture of a hydrophobized expanded mineral and a calcium aluminate with an aqueous solution of aluminum phosphate, and subsequently consolidating it under the action of pressure and heat; the expanded mineral having been hydrophobized with a hydrophobizing agent consisting substantially of (a) a fatty amine of the formula

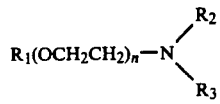

in which $R_1$ is $C_8-C_{22}$-alkyl, preferably $C_{14}-C_{22}$-alkyl, $C_{14}-C_{22}$-alkenyl or $C_8-C_{22}$-alkylphenyl, $R_2$ and $R_3$ each are hydrogen, $C_1-C_4$-alkyl or $C_2-C_4$-alkenyl, phenyl or benzyl, and n is a number of from 0 to 4;

(b) a fatty acid of the formula

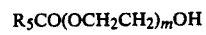

or a fatty alcohol of the formula

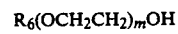

in which $R_5$ is $C_8-C_{22}$-alkyl, preferably $C_{14}-C_{22}$-alkyl or -alkenyl, $R_6$ is $C_9-C_{23}$-alkyl, preferably $C_{15}-C_{23}$-alkyl or -alkenyl, and m is a number of from 0 to 2; and (c) a low molecular weight acid.

5 Claims, No Drawings

SHAPED ARTICLES MADE FROM EXPANDED MINERALS

The use of bulky expanded minerals such as perlite or vermiculite as insulating material in cavity ceilings and two-shell masonry has been general practice for many years. Troublesome, however, is the dust formation involved and the high hydrophilic character of the materials. It is furthermore disadvantageous that in the case where such ceilings or walls have to be opened the complete bulky charge rushes out of the corresponding opening.

In order to overcome these disadvantages, attempts have been made to solidify expanded minerals by means of bitumen, melamine or phenol/formaldehyde resins. However, these materials are either flammable or must be used in uneconomic high concentrations. It is furthermore known that light expanded minerals are set by means of inorganic binders. With the use of cements such as, for example, Portland cement, and addition of large amounts of water, a perlite concrete is obtained which after a long drying time has a density of from 600 to 1,000 g/l.

As described in German Offenlegungsschrift No. 2,847,807, perlite and vermiculite can furthermore be set with monoaluminum phosphate. Also in this case, very large amounts of water must be added in order to obtain a mass which can be processed. Moreover, about 95 to 105% of binder must be mixed with the dry mass, and mineral fibers must be added in order to improve the mechanical cohesion.

It has now been found that shaped articles made from expanded minerals such as perlite or vermiculite and having improved strength are obtained by first hydrophobizing the expanded minerals and then consolidating them with aluminum phosphate in the presence of a calcium aluminate.

Subject of the invention are therefore shaped articles made from expanded minerals, which are manufactured by treating a mixture of a hydrophobized expanded mineral and a calcium aluminate with an aqueous solution of aluminum phosphate, and subsequently consolidating it under the action of pressure and heat; the expanded mineral having been hydrophobized with a hydrophobizing agent consisting substantially of (a) a fatty amine of the formula

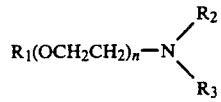

in which $R_1$ is $C_8$–$C_{22}$-alkyl, preferably $C_{14}$–$C_{22}$-alkyl, $C_{14}$–$C_{22}$-alkenyl or $C_8$–$C_{22}$-alkylphenyl, $R_2$ and $R_3$ each are hydrogen, $C_1$–$C_4$-alkyl or $C_2$–$C_4$-alkenyl, phenyl or benzyl, and n is a number of from 0 to 4;

(b) a fatty acid of the formula

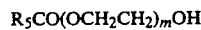

or a fatty alcohol of the formula

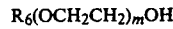

in which $R_5$ is $C_8$–$C_{22}$-alkyl, preferably $C_{14}$–$C_{22}$-alkyl or -alkenyl, $R_6$ is $C_9$–$C_{23}$-alkyl, preferably $C_{15}$–$C_{23}$-alkyl or -alkenyl, and m is a number of from 0 to 2; and (c) a low molecular weight acid.

Suitable fatty acids (b) are above all the saturated and unsaturated fatty acids and mixtures thereof such as they are obtained in the saponification of natural fats, for example tallow or coconut fatty acid, stearic, oleic or palmitic acid; analogous substances are applicable in the case of the fatty alcohols (b) and the fatty amines (a). The low molecular weight acids (c) are substantially $C_1$–$C_4$-carboxylic acids such as formic or acetic acid, dicarboxylic acids such as oxalic or malonic acid; hydrocarboxylic acids such as lactic acid, and monovalent inorganic acids such as hydrochloric or nitric acid, furthermore amidosulfonic acid. The molar mixing ratio of the individual components (a), (b) and (c) may vary within wide limits from 10:1:1 via 1:1:10 up to 1:10:1. A sufficient hydrophobizing effect is already attained when the fatty acid or fatty alcohol (b) is completely omitted. In this case the molar mixing ratio of the components (a) and (c) ranges from 10:1 to 1:10.

The components are melted together at temperatures of from about 30° to 65° C. Generally, water and/or lower alcohols are added in order to obtain pastes or liquids containing about 10 to 40 weight % of solids which can be handled well. For final use, these concentrated pastes or liquids are further diluted with water or alcohol to a content of from 2 to 10, preferably 4 to 7, weight %. The expanded minerals are then treated with these dilute dispersions, preferably by spraying, and subsequently dried. The amount of this hydrophobizing agent, relative to the expanded mineral to be treated, is from 0.3 to 3.5, preferably 0.3 to 2, weight %.

The expanded mineral so hydrophobized is subsequently mixed with a calcium aluminate, an aqueous solution of primary aluminum phosphate is added, and the mass is given the intended shape in a corresponding mold where it is consolidated by the action of pressure and heat.

As calcium aluminate, aluminous cement is used which generally contains from 35 to 44% of CaO, 35 to 44% of $Al_2O_3$, 4 to 12% of $Fe_2O_3$, 0 to 10% of FeO and 3 to 11% of $SiO_2$. Such aluminous cement types consist substantially of calcium aluminates of the formulae $CaO.Al_2O_3$, $CaO.2\ Al_2O_3$ or $CaO.7\ Al_2O_3$. The amount of calcium aluminate is from 10 to 50, preferably 30 to 40, weight %, relative to the aluminum phosphate is solid form.

For sufficiently consolidating the shaped articles, from 2 to 25, preferably 5 to 15, weight % of solid aluminum phosphate, relative to the hydrophobized expanded minerals, are required. The aluminum phosphate is used as about 40 to 50% aqueous solution and, if necessary, further diluted with water, added to the mixture of hydrophobized expanded mineral and calcium aluminate, and mixed in a mixing apparatus, where further fillers such as quartz, aluminum oxide, foams, silicium carbide, zinc oxide or mineral fibers, and synthetic fibers of polyesters, polyacrylonitrile or aromatic polyamides can be incorporated. The amount of water is generally chosen in such a manner that the complete mixture is well moistened.

After a mixing time of about 2 to 10 minutes, the moist mixture is introduced into the mold and compacted under pressure. After 5 to 10 minutes, the setting procedure is completed to such an extent that the shaped article can be removed from the mold. By heating to about 140°–250° C., it is consolidated further.

The shaped articles so manufactured, such as slabs and plates, can be applied individually as heat-insulating ceiling and wall panels, or in combination with various top layers. They are distinguished by a good green strength and a high edge stability. Advantageous for use is a sandwich type structure of the plates: the outer layers may for example consist of fine-grain material, while the inner layer is made from coarse-grain material.

The following Examples illustrate the invention.

EXAMPLE 1

80 g of perlite having a grain size distribution of below 3 mm were treated with 1 weight % of a hydrophobizing agent having the following composition: 45% of stearylamine, 2.5% of formic acid, 2.5% of stearic acid, 20% of isopropanol and 30% of water.

The perlite so hydrophobized was mixed in dry state with 2.5 g of aluminous cement having the following composition: 37% of CaO, 40% of $Al_2O_3$, 15% of $Fe_2O_3$, and the remainder $SiO_2$.

16 g of 50% aluminum phosphate solution was added to this mixture, furthermore 35 ml of water, the mass was mixed for 5 minutes by means of a paddle agitator, and charged to a $10 \times 10$ cm mold. The article was consolidated under a pressure of 0.5 kp/cm², the pressure was relieved after 5 minutes, and the shaped article was then dried and concentrated at 160° C. A stable plate having a density of 280 g/l was thus obtained which has an excellent edge stability.

EXAMPLE 2

80 g of vermiculite having a grain size distribution of below 3 mm were treated with 1.5 weight % of a hydrophobizing agent of the following composition: 29.9% of stearylamine, 16.7% of tallow fatty acid, 3.4% of acetic acid, 20% of isopropanol and 30% of water. The vermiculite so hydrophobized was mixed in dry state with 3 g of aluminous cement having the composition as indicated in Example 1. 16 g of 50% aluminum phosphate solution and 20 ml of water were added to this mixture, and the mass was treated as indicated in Example 1. A stable plate having a density of 360 g/l having an excellent edge stability was thus obtained.

COMPARATIVE EXAMPLE 1

80 g of non-hydrophobized perlite (grain size distribution below 3 mm) were well mixed with a mixture of 16 g of 50% aluminum phosphate solution and 90 ml of water, without adding aluminous cement. The moist mass was introduced into a $10 \times 10$ cm mold and consolidated. On attempts to strip the specimen after 5, 10 and 30 minutes, respectively, it broke into pieces, so that it had to be dried and concentrated in the mold. The strength was sufficient, the surface was nearly not abrasion-proof, and the edge stability was poor.

COMPARATIVE EXAMPLE 2

80 g of perlite (grain size distribution less than 3 mm) treated with 1.0% of hydrophobizing agent according to Example 1 were mixed with a mixture of 16 g of 50% aluminum phosphate solution and 35 ml of water, without adding aluminous cement, and further processed. As in Comparative Example 1, the specimen could not be stripped after 5, 10 and 30 minutes, respectively, without breaking into pieces. It was dried and concentrated in the mold. The strength was sufficient, the surface was nearly not abrasion-proof and the edge stability was poor.

What is claimed is:

1. Shaped articles made from expanded minerals obtained by treating a mixture of a hydrophobized expanded mineral and a calcium aluminate with an aqueous solution of aluminum phosphate, and subsequently consolidating it under the action of pressure and heat; the expanded mineral having been hydrophobized with a hydrophobizing agent consisting substantially of (a) a fatty amine of the formula

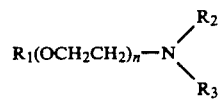

in which $R_1$ is $C_8$–$C_{22}$-alkyl, preferably $C_{14}$–$C_{22}$-alkyl, $C_{14}$–$C_{22}$-alkenyl or $C_8$–$C_{22}$-alkylphenyl, $R_2$ and $R_3$ each are hydrogen, $C_1$–$C_4$-alkyl or $C_2$–$C_4$-alkenyl, phenyl or benzyl, and n is a number of from 0 to 4;

(b) a fatty acid of the formula $R_5CO(OCH_2CH_2)_mOH$ or a fatty alcohol of the formula $R_6(OCH_2CH_2)_mOH$ in which $R_5$ is $C_8$–$C_{22}$-alkyl, preferably $C_{14}$–$C_{22}$-alkyl or -alkenyl, $R_6$ is $C_9$–$C_{22}$-alkyl, preferably $C_{15}$–$C_{23}$-alkyl or -alkenyl, and m is a number of from 0 to 2; and (c) a low molecular weight acid.

2. The shaped articles as claimed in claim 1 manufactured with the use of from 2 to 25 weight % of monoaluminum phosphate, relative to the expanded mineral.

3. The shaped articles as claimed in claim 1 manufactured with the use of from 10 to 50 weight % of aluminous cement, relative to the aluminum phosphate.

4. The shaped articles as claimed in claim 1 manufactured from an expanded mineral treated with 0.3 to 3.5 weight % of the hydrophobizing agent.

5. Shaped articles made from expanded minerals obtained by treating a mixture of hydrophobized expanded mineral and a calcium aluminate with an aqueous solution of aluminum phosphate, and subsequently consolidating it under the action of pressure and heat; the expanded mineral having been hydrophobized with a hydrophobizing agent consisting substantially of a hydrophobizing agent consisting essentially of a fatty amine of the formula

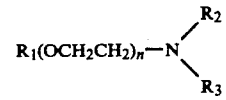

in which $R_1$ is $C_8$–$C_{22}$-alkyl, preferably $C_{14}$–$C_{22}$-alkyl, $C_{14}$–$C_{22}$-alkenyl or $C_8$–$C_{22}$-alkylphenyl, $R_2$ and $R_3$ each are hydrogen, $C_1$–$C_4$-alkul or $C_2$–$C_4$-alkenyl, phenyl or benzyl, and n is a number of from 0 to 4; and a low molecular weight acid; the molar mixing ratio of the fatty amine and the low molecular weight acid ranging from 10:1 to 1:10.

* * * * *